United States Patent
Lane

(10) Patent No.: US 12,038,769 B2
(45) Date of Patent: Jul. 16, 2024

(54) BATTERY MANAGEMENT FOR MACHINE SERVICE OPERATIONS

(71) Applicant: Caterpillar Global Mining Equipment LLC, Tucson, AZ (US)

(72) Inventor: Cameron Thomas Lane, Oro Valley, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 82 days.

(21) Appl. No.: 17/537,365

(22) Filed: Nov. 29, 2021

(65) Prior Publication Data
US 2023/0168696 A1 Jun. 1, 2023

(51) Int. Cl.
| | | |
|---|---|---|
| G05D 1/12 | (2006.01) | |
| B60L 58/12 | (2019.01) | |
| G01C 21/34 | (2006.01) | |
| G05D 1/00 | (2006.01) | |

(52) U.S. Cl.
CPC ............... G05D 1/12 (2013.01); B60L 58/12 (2019.02); G01C 21/343 (2013.01); G01C 21/3469 (2013.01); G05D 1/0217 (2013.01)

(58) Field of Classification Search
CPC ..... G01R 31/36; G01R 31/367; G01R 31/382
See application file for complete search history.

(56) References Cited

U.S. PATENT DOCUMENTS

| | | | |
|---|---|---|---|
| 5,744,938 A | * | 4/1998 | Rogers ................. G01R 31/374 320/134 |
| 7,841,433 B2 | | 11/2010 | Soliman et al. |
| 8,360,343 B2 | | 1/2013 | Gudat et al. |
| 8,543,272 B2 | | 9/2013 | Yu et al. |
| 8,983,657 B2 | | 3/2015 | Jacobson |
| 8,983,675 B2 | | 3/2015 | Dawson et al. |
| 9,283,954 B2 | | 3/2016 | Dalum |

(Continued)

FOREIGN PATENT DOCUMENTS

| | | |
|---|---|---|
| CN | 103991384 B | 8/2014 |
| CN | 103818264 B | 3/2016 |

(Continued)

OTHER PUBLICATIONS

Written Opinion and International Search Report for Int'l. Patent Appln. No. PCT/US2022/080296, mailed Apr. 11, 2023 (9 pgs).

*Primary Examiner* — Vivek D Koppikar
*Assistant Examiner* — Godfrey Aleksander Maciorowski

(57) ABSTRACT

A system can plan a route for a machine, such as an electric vehicle or other mobile machine, from a current location of the machine to a maintenance station where a service operation is to be performed on the machine. The service operation can be associated with a target state of charge (SoC) for a battery of the machine. The system can plan the route such that an expected energy consumption level, associated with traversal of the route by the machine, causes the SoC of the battery to satisfy the target SoC when the machine arrives at the maintenance station. The system can also dynamically adjust the route, charges of the battery, and/or machine operations performed along the route, during travel to cause the SoC of the battery to satisfy the target SoC when the machine arrives at the maintenance station.

20 Claims, 4 Drawing Sheets

(56) References Cited

U.S. PATENT DOCUMENTS

| | | |
|---|---|---|
| 9,545,854 B2 | 1/2017 | Daum et al. |
| 9,669,821 B1 | 6/2017 | Laing |
| 9,805,317 B2 | 10/2017 | Gudat et al. |
| 10,696,164 B2 | 6/2020 | Zhao et al. |
| 10,753,761 B2 | 8/2020 | Ricci |
| 10,787,092 B2 | 9/2020 | Hou et al. |
| 10,800,398 B2 | 10/2020 | Duan et al. |
| 10,836,371 B1 | 11/2020 | Thiruvengadam et al. |
| 10,882,399 B2 | 1/2021 | Koebler et al. |
| 10,946,764 B2 | 3/2021 | Morimoto et al. |
| 2014/0114514 A1 | 4/2014 | Crombez et al. |
| 2014/0149010 A1* | 5/2014 | Li .................. B60L 15/2045 701/70 |
| 2016/0176309 A1 | 6/2016 | Jeon et al. |
| 2018/0045533 A1 | 2/2018 | Jackson et al. |
| 2018/0060776 A1 | 3/2018 | Ahmed et al. |
| 2018/0143029 A1* | 5/2018 | Nikulin ............ G01C 21/3415 |
| 2018/0164814 A1* | 6/2018 | Poeppel ................ G06Q 10/20 |
| 2018/0203443 A1* | 7/2018 | Newman .................. B60L 1/00 |
| 2018/0204161 A1 | 7/2018 | Sandulescu et al. |
| 2019/0344777 A1 | 11/2019 | Ourabah et al. |
| 2020/0070679 A1 | 3/2020 | Wang et al. |
| 2020/0122728 A1 | 4/2020 | Murase |
| 2021/0310818 A1 | 10/2021 | Kim et al. |

FOREIGN PATENT DOCUMENTS

| | | |
|---|---|---|
| CN | 107117038 B | 9/2017 |
| CN | 10979537 A | 5/2019 |
| CN | 109878355 A | 6/2019 |
| CN | 111366211 A | 7/2020 |
| CN | 111907335 A | 11/2020 |
| JP | 2017154693 A | 9/2017 |
| WO | 2016095936 A1 | 6/2016 |
| WO | WO2019210745 A1 | 11/2019 |
| WO | WO2020199873 A1 | 10/2020 |

* cited by examiner

BATTERY MANAGEMENT FOR MACHINE SERVICE OPERATIONS

TECHNICAL FIELD

The present disclosure relates to battery-powered electric machines and, more particularly, to managing a state of charge (SoC) of a battery of a machine in preparation for a service operation.

BACKGROUND

Electric machines, such as vehicles or other mobile machines, that are at least partially powered by on-board batteries can be environmentally-friendly alternatives to machines powered by fossil fuels. The SoC of a battery of an electric machine can vary over time, for instance as the battery is charged or discharged. For example, the battery can be charged when the machine is connected to a charging station or other external power source, and/or when a regenerative braking system captures energy during deceleration of the machine. Some operations of the machine, such as operations to propel movement of the machine, can consume energy stored in the battery, and thereby discharge the battery.

Various systems have been developed to manage the SoC of a battery for machine. For example, U.S. Patent Publication No. 2019/0344777 to Ourabah et al. (hereinafter "Ourabah") describes a system for optimizing energy consumption of a hybrid vehicle that includes both an internal combustion engine and an electric engine. The system described in Ourabah uses route planning to divide a planned route into sections, and to determine which route sections the hybrid vehicle should travel using the internal combustion engine and which route sections the hybrid vehicle should travel using the electric engine. The route planning system described in Ourabah can accordingly extend the lifetime of the battery by causing the hybrid vehicle to use the internal combustion engine while traveling through sections of a planned route that might otherwise negativity impact the health of the battery, and to use the electric engine while traveling through other sections of the planned route that may be less damaging to the health of the battery. In some situations, the route planning system described in Ourabah can also manage usage of energy stored in the battery during travel through the planned route, such that the battery is fully discharged at the completion of travel through the planned route.

However, although the system described in Ourabah may use route planning to extend the life of a battery of a vehicle and/or manage the SoC of the battery of the vehicle, the system relies on balancing usage of an internal combustion engine and an electric engine. Accordingly, the system described in Ourabah is not suited for use with electric vehicles and other mobile machines that do not have an internal combustion engine. Moreover, because the system described in Ourabah is configured to cause a battery of a vehicle to be fully discharged when the vehicle arrives at a destination of a planned route, in some situations the system described in Ourabah could cause an electric vehicle to become stranded at the destination, as a fully discharged battery would not be able to provide energy to propel the vehicle to a subsequent destination. Similarly, if a service operation were to be performed on the vehicle at the destination of the planned route, it may not be possible to perform the service operation if the battery is fully discharged according to the system described in Ourabah.

The example systems and methods described herein are directed toward overcoming one or more of the deficiencies described above.

SUMMARY OF THE INVENTION

According to a first aspect, a computer-implemented method includes determining, by one or more processors, a service operation to be performed on a machine at a maintenance station. The computer-implemented method also includes determining, by the one or more processors, a target SoC associated with the service operation. The computer-implemented method further includes determining, by the one or more processors, a current SoC of a battery of the machine. The computer-implemented method additionally includes generating, by the one or more processors, a route between a current location of the machine and the maintenance station. The route is generated by determining an expected energy consumption level associated with traversal of the route by the machine, determining an expected destination SoC associated with the route, based on the current SoC of the battery and the expected energy consumption level, and determining that the expected destination SoC satisfies the target SoC. The computer-implemented method also includes dispatching, by the one or more processors, the machine to traverse the route.

According to a further aspect, a computing system includes one or more processors and memory storing computer-executable instructions. The computer-executable instructions, when executed by the one or more processors, cause the one or more processors to perform operations. The operations include determining a service operation to be performed on a machine at a maintenance station. The operations also include determining a target SoC associated with the service operation. The operations further include determining a current SoC of a battery of the machine. The operations additionally include generating a route between a current location of the machine and the maintenance station, by determining an expected energy consumption level associated with traversal of the route by the machine, determining an expected destination SoC associated with the route, based on the current SoC of the battery and the expected energy consumption level, and determining that the expected destination SoC satisfies the target SoC. The operations also include dispatching the machine to traverse the route.

According to another aspect, a dispatch controller includes one or more processors and memory storing computer-executable instructions. The computer-executable instructions, when executed by the one or more processors, cause the one or more processors to perform operations. The operations include receiving an indication of a service operation to be performed on a machine at a maintenance station. The operations also include determining a target SoC associated with the service operation. The operations further include receiving machine data from the machine. The machine data indicates a current location of the machine, and a current SoC of a battery of the machine. The operations additionally include generating a route between the current location of the machine and the maintenance station, by determining an expected energy consumption level associated with traversal of the route by the machine, determining an expected destination SoC associated with the route, based on the current SoC of the battery and the expected energy consumption level, and determining that the expected destination SoC satisfies the target SoC. The operations also include transmitting dispatch data to the machine. The dispatch data includes the target SoC and route data indicating a path of the route.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
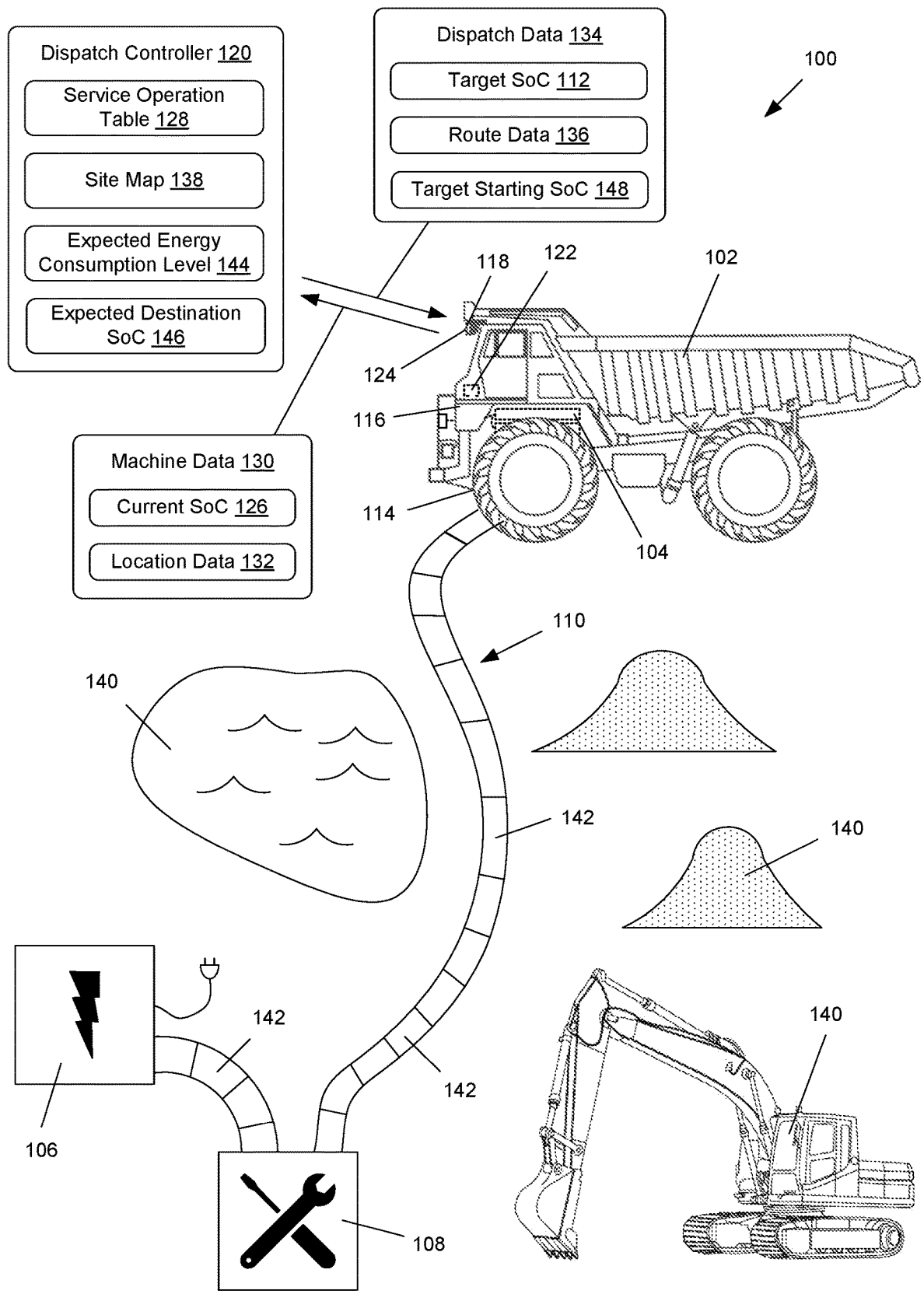
FIG. 1 shows an example worksite, and an example machine associated with the worksite.

FIG. 1 shows an example worksite 100, and an example machine 102 associated with the worksite 100. The machine 102 can be a mobile machine or vehicle that is configured to be at least partially powered by a battery 104. For example, the machine 102 can be a battery electric machine (BEM), a battery electric vehicle (BEV), a hybrid vehicle, a fuel cell and battery hybrid vehicle, or another mobile machine that is at least partially powered by the battery 104. The machine 102 can travel around the worksite 100, for example from a charging station 106 to one or more work locations. The machine 102 can also travel to a maintenance station 108 at the worksite 100. The maintenance station 108 can be a location or facility where service operations, such as maintenance and/or repair operations, can be performed on the machine 102. The machine 102 can be configured to travel through the worksite 100 along a route 110. The route 110 can be, or include, a path from a current location of the machine 102 to the maintenance station 108. The route 110, and/or operations performed by the machine 102 along the route 110, can be determined such that the SoC of the battery 104 satisfies a target SoC 112 by the time the machine 102 arrives at the maintenance station 108. In some examples, the target SoC 112 can be a SoC associated with a service operation that is to be performed on the machine 102 at the maintenance station 108, as discussed further below.

The machine 102 can have one or more electric engines, electric motors, electrical conversion systems, electric drivetrains, and/or other electrical components that are configured to convert and/or use energy, such as energy stored in the battery 104, to cause overall movement of the machine 102 while driving and/or to cause movement of individual work tools and other components of the machine 102. As an example, the machine 102 can have a traction motor that is configured to consume energy stored in the battery 104 to turn wheels of the machine 102.

The machine 102 can, in some examples, be a commercial or work machine, such as a mining machine, earth-moving machine, backhoe, scraper, dozer, loader (e.g., large wheel loader, track-type loader, etc.), shovel, truck (e.g., mining truck, haul truck, on-highway truck, off-highway truck, articulated truck, etc.), a crane, a pipe layer, farming equipment, or any other type of mobile machine or vehicle. As noted above, the machine 102 can operate at, and/or travel around, the worksite 100. The worksite 100 can be a mine site, a quarry, a construction site, or any other type of worksite or work environment. As an example, the machine 102 can be a haul truck that moves dirt, rocks, gravel, and/or other material around the worksite 100. In other examples, the machine 102 can be an electric automobile or other type of mobile machine used for personal transportation, commercial transportation, or other purposes, such as an electric vehicle configured to travel on public and/or private roads. In these examples, the worksite 100 can include navigable areas through which the machine 102 can travel.

The battery 104 of the machine 102 can include one or more batteries, such as lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some examples, multiple battery cells can be grouped together, in series or in parallel, within a battery module. Multiple battery modules can also be grouped together, for instance in series, within a battery string. One or more battery strings can be provided within a battery pack, such as a group of battery strings linked together in parallel. Accordingly, the battery 104 can include one or more battery packs, battery strings, battery modules, and/or battery cells.

The machine 102 can have one or more brake systems 114, such as a service brake system, a regenerative brake system, and/or a resistive brake system. The service brake system can be a hydraulic braking system or other braking system configured to apply brake pads against rotors to frictionally slow down wheels of the machine 102. The regenerative brake system can be configured to capture kinetic energy and/or potential energy during braking and/or deceleration of the machine 102, and to store the captured energy in the battery 104. The resistive brake system can be a dynamic braking system that is configured to similarly capture kinetic energy and/or potential energy during braking and/or deceleration of the machine 102, and to dissipate the energy as heat in one or more resisters in the machine 102.

The machine 102 can also have one or more parasitic systems 116. Parasitic systems 116 can be systems or components that can be powered by energy stored in the battery 104, energy captured by one or more of the brake systems 114, and/or by energy provided by other elements of the machine 102. For example, the parasitic systems 116 can include heating and/or cooling systems configure to adjust the temperature of the battery 104, a cab of the machine 102, and/or other elements of the machine 102. The parasitic systems 116 can also, or alternately, include a resistive grid with a coil that can conduct electricity while blowers blow air across the coil. Such a resistive coil can consume energy by converting the energy to heat. The resistive grid can be a component of a resistive brake system as described above, or can be a separate component configured to convert energy that had been stored in the battery 104 into heat. The parasitic systems 116 can also, or alternately, include hydraulic pumps or other elements that can consume energy, mechanical systems that consume energy by moving mechanized elements, lights that operate by consuming energy, and/or any other system or component that can consume energy.

The machine 102 can have one or more wireless communication interfaces 118, such as cellular interfaces, WiFi® interfaces, Bluetooth® interfaces, machine-to-machine data interfaces, and/or other types of wireless communication interfaces. The wireless communication interfaces 118 can include modems, receivers, transmitters, antennas, and/or other hardware or software elements configured to send and receive data.

In some examples, the machine 102 can use the wireless communication interfaces 118 to communicate with a dispatch controller 120, as described further below. The dispatch controller 120 can be one or more servers, computers, or other off-board computing devices that are separate from the machine 102. For example, while the machine 102 can be located at the worksite 100, the dispatch controller 120 can be located at a back office or other location that is remote from the machine 102, or that is remote from the worksite 100 overall. In some examples, one or more functions of the dispatch controller 120 can be implemented by an application executing on a laptop computer, smartphone, tablet computer, or other mobile device used by an operator of the machine 102 or another user located away from the machine 102. The dispatch controller 120 can be configured to monitor operations of the machine 102, for instance based on data reported by the machine 102 via the wireless communication interfaces 118. In some examples, the dispatch controller 120 can also determine the route 110 for the machine 102 and instruct the machine 102 to travel along the route 110, as discussed further below.

The machine 102 can be a staffed machine, a semi-autonomous machine, or an autonomous machine. In examples in which the machine 102 is a staffed machine or a semi-autonomous machine, a human operator or driver can operate, control, or direct some or all of the functions of the machine 102. However, in examples in which the machine 102 is autonomous or semi-autonomous, functions of the machine 102, such as steering, speed adjustments, work tool positioning and movement, and/or other functions can be fully or partially controlled, automatically or semi-automatically, by on-board and/or off-board controllers or other computing devices associated with the machine 102.

As an example, the machine 102 can have an electronic control module (ECM) 122 or other on-board computing device that can fully or partially control operations of the machine 102. For instance, the machine 102 can have an on-board guidance system that can drive the machine 102 through the route 110 autonomously, an obstacle detection system that assists the on-board guidance system or can alert a human operator of nearby objects detected by the obstacle detection system, and/or other systems that fully or partially control operations of the machine 102. As another example, the dispatch controller 120 or another off-board computing device can receive data from the machine 102 and return instructions to the machine 102 to fully or partially control operations of the machine 102 remotely.

The machine 102 can have one or more sensors 124. The sensors 124 can include cameras, LIDAR sensors, RADAR sensors, other optical sensors or perception systems, Global Positioning System (GPS) sensors, other location and/or positioning sensors, payload monitors, speed sensors, temperature sensors, tire pressure sensors, battery state of health (SoH) sensors, and/or other types of sensors. The battery SoH sensors can be configured to determine a current SoC 126 of the battery 104. In some examples, one or more battery SoH sensors can also detect a state of health of the battery 104, such as abilities of the battery 104 to maintain a charge, receive a charge, and/or transfer energy at a power level. The battery SoH sensors can also, in some examples, detect temperatures associated with the battery 104, an operating state of a cooling system configured to cool the battery 104, and/or other attributes or characteristics of the battery 104.

In some examples, one or more of the sensors 124 can provide data to the ECM 122 of the machine 102 and/or the dispatch controller 120, such that the ECM 122 and/or the dispatch controller 120 can determine a location of the machine 102, detect nearby terrain, detect nearby objects, such as vehicles, other machines, or personnel, detect the positions of such nearby objects relative to the machine 102, determine a weight and/or amount of a payload carried by the machine 102, and/or perform other operations that enable the machine 102 to drive and/or operate autonomously or semi-autonomously. Data associated with one or more of the sensors 124 can also be provided to a driver or other operator of the machine 102 via dashboard indicator lights, screens, or other displays, for instance if the machine 102 is a staffed machine.

As discussed above, the machine 102 can travel to the maintenance station 108, for instance if one or more service operations are to be performed on the machine 102 at the maintenance station 108. In some examples, the service operations can be pre-determined or pre-scheduled service operations. For instance, the dispatch controller 120 can access a maintenance schedule associated with the machine 102, determine that the machine 102 is due for one or more service operations, and instruct the machine 102 to travel to the maintenance station 108 so that the one or more service operations can be performed. In other examples, a manager or other user can provide user input to the dispatch controller 120 that identifies the machine 102 and/or one or more user-selected service operations, and that causes the dispatch controller 120 to instruct the machine 102 to travel to the maintenance station 108 so that the one or more service operations can be performed. In other examples, sensor data provided by one or more sensors 124 can indicate, to the ECM 122 or the dispatch controller 120, that the machine 102 is experiencing a fault or other maintenance issue that can be corrected or mitigated at the maintenance station 108. The machine 102 can accordingly travel to the maintenance station 108 for unplanned maintenance upon the detection of such a fault or other maintenance issue.

Some service operations that can be performed at the maintenance station 108 can be associated with particular SoC levels for the battery 104, or particular ranges of SoC levels for the battery 104. For example, if technicians at the maintenance station 108 would perform certain service operations in part by accessing the battery 104, by interacting with electrical components of the machine 102 that are electrically connected to the battery 104, by removing the battery 104, or by otherwise interacting directly or indirectly with the battery 104, it may be desirable to perform such operations when the SoC of the battery 104 is within a certain range, is above a threshold value, or is below a threshold value. For instance, some service operations may be safest to perform when the SoC of the battery 104 is at or below a predetermined SoC level. Other service operations may involve consumption of energy stored in the battery 104, such that the service operations could not be performed, or would be more difficult to perform, if the SoC of the battery 104 is below a predetermined SoC level.

Accordingly, different service operations can be associated with different corresponding target SoC levels. A target SoC level can be a specific SoC level considered to be optimal for a service operation, a minimum SoC level for a service operation, a maximum SoC level for a service operation, a range of SoC levels that are considered to be optimal for a service operation, or any other specific SoC level or range of SoC levels. Some service operations can be associated with higher target SoC levels than other service operations. For example, a first service operation can correspond with a target SoC level of 75%, a second service operation can correspond with a target SoC level of 50%, and a third service operation can correspond with a target SoC level of 25%. In some examples, the same target SoC level can be associated with multiple service operations.

As described herein, the route 110, and/or operations of the machine 102 along the route 110, can be determined such that the machine 102 arrives at the maintenance station 108 with the battery 104 at a SoC that satisfies the target SoC 112. The target SoC 112 can be a target SoC level that corresponds with a particular service operation to be performed on the machine 102 at the maintenance station 108. The dispatch controller 120 and/or the ECM 122 can store, or have access to, a service operation table 128. The service operation table 128 can be a table or database of predefined target SoC levels that correspond with various service operations. Accordingly, the dispatch controller 120 and/or the ECM 122 can use the service operation table 128 to determine the target SoC 112 that corresponds with the particular service operation to be performed on the machine 102. The dispatch controller 120 and/or the ECM 122 can also determine a path for the route 110, and/or operations the machine 102 is to perform along the route 110, that are predicted to cause the SoC of the battery 104 to satisfy the target SoC 112 when the machine 102 completes travel along the route 110 and arrives at the maintenance station 108.

The service operation table 128 can indicate target SoC levels that correspond with particular service operations. In some examples, target SoC levels for service operations can be preset at values that are at least a minimum target SoC level. For instance, if a particular service operation is unrelated to the battery 104, the SoC of the battery 104 may be unrelated to performance of the service operation itself. However, the service operation can nevertheless be associated with at least a minimum target SoC level that is sufficient to power travel of the machine 102 from the maintenance station 108 to the charging station 106, without the SoC of the battery 104 dropping below a minimum operable SoC level of the battery 104 by the time the machine 102 arrives at the charging station 106.

As a non-limiting example, if the machine 102 traveling from the maintenance station 108 to the charging station 106 is expected to use 10% of the SoC of the battery 104, and the battery 104 has a minimum operable SoC level of 15%, the minimum target SoC level for the service operations can be 25%. Accordingly, if the machine 102 is dispatched to travel to the maintenance station 108 for a tire change or another service operation that is unrelated to the battery 104 itself, the service operation can be associated with at least the 25% minimum target SoC level. Accordingly, although the service operation may be able to be performed at the maintenance station 108 regardless of the SoC of the battery 104, the tire change operation can be associated with at least the 25% target SoC level so that the machine 102 arrives at the maintenance station 108 with at least a 25% SoC. In this example, because the machine 102 can arrive at the maintenance station 108 with the battery 104 at least at 25% SoC, the battery 104 can have sufficient stored energy to power travel of the machine 102 from the maintenance station 108 to the charging station 106 after the service operation is completed, such that the machine 102 is expected to reach the charging station 106 with the SOC of the battery 104 above the 15% minimum operable SoC level of the battery 104.

Although some service operations can be associated with the minimum target SoC level, other service operations can be associated with target SoC levels that are higher than the minimum target SoC level. As an example, if performance of a service operation involves accessing an electrical system or other system associated with the battery 104, and may rely on energy stored in the battery 104, the target SoC level for that service operation may be 75%, or another SoC level that is higher than a 25% minimum target SoC level. As another example, a service operation that involves replacement of the battery 104 can be associated with a 50% target SoC level, or other target SoC level that is different than the minimum target SoC level, as it may be considered optimal to remove and/or store the battery 104 when the battery 104 is approximately halfway discharged.

In some examples, the target SoC level associated with a particular service operation can depend, at least in part, on a predicted duration of the service operation or a duration of time until the machine 102 is expected to next be operated. For example, if a particular service operation is associated with the installation of an out-of-stock part that may not be delivered to the maintenance station 108 for a period of days or weeks after the machine 102 arrives at the maintenance station 108, the machine 102 may be parked at or near the maintenance station 108 until the part is delivered. Accordingly, in this example, the target SoC level for the particular service operation may be higher than the target SoC level would have been if the part had already been in stock, to ensure that the battery 104 has sufficient charge to remain operable while parked for days or weeks until the part is delivered and the service operation can be completed. As another example, if the machine 102 will be intentionally parked for a period of time before returning to perform work operations on the worksite 100, the target SoC level can be set at a value that is predicted to allow the machine 102 to perform those work operations, or to return to the charging station 106 to charge the battery 104, once the machine 102 is next assigned to perform work operations after being parked for the period of time.

The machine 102 can be configured to determine machine data 130, including the current SoC 126 of the battery 104 and location data 132 indicating a current location of the machine 102 on the worksite 100. The location data 132 can, for example, be determined by GPS sensors or other sensors 124 of the machine 102. In some examples, the machine 102 can transmit the machine data 130 to the dispatch controller 120. For example, the machine 102 can transmit machine data 130 to the dispatch controller 120 periodically, occasionally, on a predetermined schedule, in response to a request from the dispatch controller 120, based on one or more conditions or rules, or at any other time or for any other reason. As a non-limiting example, if the ECM 122 determines that the machine 102 is experiencing a maintenance issue and should travel to the maintenance station 108, the machine 102 can transmit the machine data 130 to the dispatch controller 120 along with a notification of the maintenance issue.

The machine 102 can travel to the maintenance station 108 based at least in part on dispatch data 134 determined by the dispatch controller 120 and/or the ECM 122. In some examples, the dispatch controller 120 can determine the dispatch data 134 in response to a determination that the machine 102 is to travel to the maintenance station 108 for a particular service operation, and can transmit the dispatch data 134 to the machine 102. In other examples, the ECM 122 of the machine 102 can itself determine the dispatch data 134 in response to a determination that the machine 102 is to travel to the maintenance station 108 for a particular service operation.

The dispatch data 134 can indicate the target SoC 112 associated with the particular service operation to be performed on the machine 102 at the maintenance station 108. As discussed above, the dispatch controller 120 and/or the ECM 122 can have access to the service operation table 128 that indicates predefined target SoC levels that correspond to various service operations, and can accordingly look up the target SoC 112 associated with the particular service operation to be performed on the machine 102 at the maintenance station 108. For example, if the dispatch controller 120 determines that the machine 102 is to travel to the maintenance station 108 so that a particular service operation can be performed, for instance in response to a predefined maintenance schedule, a user instruction, or a notification of a maintenance issue received from the machine 102, the dispatch controller 120 can look up the target SoC 112 associated with that particular service operation in the service operation table 128 and include the target SoC 112 in the dispatch data 134.

The dispatch data 134 can also include route data 136 associated with the route 110. The route data 136 can include coordinates of a path for the route 110 through the worksite 100, instructions associated with operations to be performed by the machine 102 along the route 110, and/or other data associated with the route 110. In examples in which the machine 102 is a staffed or semi-autonomous machine operated by a driver, the route data 136 can include navigation instructions that can be displayed via a screen of a navigation system, audibly presented via speakers, and/or otherwise presented to the driver such that the driver can drive the machine 102 along the route 110 to the maintenance station 108. In other examples in which the machine 102 is an autonomous machine, the route data 136 can include instructions that the autonomous machine can follow to automatically drive the machine 102 along the route 110 to the maintenance station 108.

In some examples, the route data 136 can also indicate one or more machine operations that the machine 102 is to perform before beginning travel along the route 110 and/or at locations along the path of the route 110. For example, the route data 136 can indicate that the machine 102 is assigned to perform one or more work operations along the route 110 and/or before beginning travel along the route 110, connect to one or more charging stations along the route 110 and/or before beginning travel along the route 110, turn one or more parasitic systems 116 on or off along the route 110, and/or perform other machine operations as described further below.

As a non-limiting example, the dispatch controller 120 and/or the ECM 122 may determine that travel through the route 110 would cause the SoC of the battery 104 to drop below the target SoC 112 of a service operation by the time the machine 102 reaches the maintenance station 108. The dispatch controller 120 and/or the ECM 122 can accordingly cause the machine 102 to visit the charging station 106 or another charging station 106 to increase the SoC of the battery 104 to a target starting SoC before beginning travel along the route 110, as discussed further below. In this example, the dispatch controller 120 and/or the ECM 122 can determine the target starting SoC as an SoC that, if decreased by an amount of energy predicted to be consumed during traversal of the route 110 by the machine 102, would cause the SoC of the battery 104 to satisfy the target SoC 112 associated with the service operation when the machine 102 reaches the maintenance station.

The dispatch controller 120 and/or the ECM 122 can have, or have access to, a site map 138 associated with the worksite 100. The site map 138 can indicate terrain of the worksite 100, locations and/or identities of obstacles 140 on the worksite 100, the location of the machine 102 on the worksite 100, ground types and/or ground conditions associated with portions of the worksite 100, and/or other information associated with the worksite. For instance, the site map 138 can indicate positions of fixed and/or movable obstacles 140 on the worksite, such as other machines, personnel, lakes, ponds, rivers, cliff faces, hills, roads, intersections, mounds of dirt, gravel, or other material, and/or other types of objects, terrain features, or obstacles. The site map 138 can also indicate grades or slopes of portions of the worksite 100, such as incline levels or decline levels associated with portions of the worksite 100. Accordingly, the dispatch controller 120 and/or the ECM 122 can use the site map 138 to plan the route 110 and/or route data 136, such that the machine 102 can avoid obstacles 140 while following the route 110, can travel over terrain that is navigable by the machine 102, and/or can otherwise follow the route 110.

The route 110 can be divided into segments 142. An individual segment can be a portion of the route 110 that has the same or similar attributes, such as a same or a similar incline level or decline level, a same or similar direction or orientation through the worksite 100, a same or similar ground type, or any other shared attributes. As an example, a portion of the route 110 can have multiple segments 142, such as a first segment that inclines at a consistent angle, a second segment that declines at a consistent angle, and a third angle that is substantially flat without an incline or a decline. The dispatch controller 120 and/or the ECM 122 can define the route 110 and its segments 142 based in part on terrain information indicated by the site map 138, for instance based on grade information associated with the terrain of the worksite 100.

The dispatch controller 120 and/or the ECM 122 can also determine the route data 136, including a particular path for the route 110, at least in part by determining an expected energy consumption level 144 associated with travel along the route 110 from the current location of the machine 102 to the maintenance station 108. The expected energy consumption level 144 can be a combination of energy expected to be consumed by, and energy expected to be captured during, operations of the machine 102 while traveling along the route 110. The expected energy consumption level 144 can be based on a model of the machine 102 that indicates a size of the machine 102, a weight of the machine 102, a weight of a payload carried by the machine 102, and/or based on physics models indicating amounts of energy likely to be consumed and/or captured based on grades and/or distances of the segments 142, and/or other factors. In some examples, the expected energy consumption level 144 can be determined by a machine learning model that has been trained on historical data indicating energy consumption levels associated with traversal of terrain by the machine 102 or similar machines through segments 142 associated one or more grades and/or distances.

In some examples, the expected energy consumption level 144 can be determined by determining expected energy consumption levels associated with individual segments 142 of the route 110, and by totaling the expected energy consumption levels associated with individual segments 142. For example, an electric engine of the machine 102 may consume a first amount of energy to propel the machine along a first segment of the route 110 associated with an incline, but a regenerative braking system of the machine 102 may capture a second amount of energy and charge the battery 104 based on deceleration of the machine 102 during travel along a second segment of the route 110 associated with a decline. The dispatch controller 120 and/or the ECM 122 can predict, estimate, or determine operations of the machine 102 that will be performed at individual segments 142 of the route 110. For example, based on a length and grade of a particular segment, the dispatch controller 120 and/or the ECM 122 can determine whether the machine 102 will likely need to brake while traveling through the segment, accelerate through the segment, and/or perform other operations to traverse the segment. The dispatch controller 120 and/or the ECM 122 can also determine corresponding expected energy consumption levels associated with the operations to be performed at individual segments 142. As such, the overall expected energy consumption level 144 associated with travel along the route 110 can be a combination of an amount of energy expected to be consumed along the route 110 and an amount of energy expected to be captured along the route 110.

Accordingly, the dispatch controller 120 and/or the ECM 122 can determine a path for the route 110 such that the expected energy consumption level 144 is expected to change the SoC of the battery 104 from the current SoC 126 to an expected destination SoC 146 that satisfies the target SoC 112 by the time the machine 102 concludes traveling along the route 110 and arrives at the maintenance station 108. As a non-limiting example, the dispatch controller 120 or the ECM 122 can determine a path for the route 110 based on the formula below, such that the target SoC 112 (SoC$_{target}$) can be reached by the end of the route 110 by subtracting the expected energy consumption level 144 (Consumption$_{expected}$) from the current SoC 126 (SoC$_{current}$):

$$SoC_{target} = SoC_{current} - Consumption_{expected}.$$

The above formula can also be rewritten as shown below, such that the dispatch controller 120 or the ECM 122 can determine a path for the route 110 so that the expected energy consumption level 144 is equal to a difference between the current SoC 126 and the target SoC 112:

$$Consumption_{expected} = SoC_{current} - SoC_{target}.$$

If the expected energy consumption level 144 associated with travel along the route 110 would cause the SoC of the battery 104 to be at a value at the end of the route 110 that satisfies the target SoC 112, the dispatch controller 120 or the ECM 122 can cause the machine 102 to travel along the route 110. For instance, the dispatch controller 120 can transmit dispatch data 134, including route data 136 associated with the route 110, to the machine 102 that causes the machine 102 to autonomously travel along the route 110 or to present the route data 136 to a driver of the machine 102.

However, if the expected energy consumption level 144 associated with travel along the route 110 would cause the SoC of the battery 104 to be at a value at the end of the route 110 that does not satisfy the target SoC 112, the dispatch controller 120 or the ECM 122 can modify the route 110 or generate a new route before causing the machine 102 to follow the dispatch data 134 and travel along the route 110. For example, the dispatch controller 120 can generate a candidate route by which the machine 102 could travel from its current location to the maintenance station 108. The dispatch controller 120 can also generate the expected energy consumption level 144 for the candidate route, for instance based on energy the dispatch controller 120 predicts the machine 102 will consume and/or capture while traveling through segments 142 of the candidate route. The dispatch controller 120 can also generate the expected destination SoC 146, which the dispatch controller 120 predicts the battery 104 will be at when the machine 102 reaches the maintenance station 108 at the conclusion of the candidate route, by subtracting the expected energy consumption level 144 for the candidate route from the current SoC 126. If the expected destination SoC 146 is below the target SoC 112 for the service operation, the dispatch controller 120 can generate a new candidate route that takes an alternate path with one or more different segments 142, and can determine whether the expected destination SoC for the new candidate route would satisfy the target SoC 112 for the service operation.

As a non-limiting example, if the target SoC 112 is a specific SoC value or a specific range of SoC values, and the expected energy consumption level 144 for the route 110 would cause the SoC of the battery 104 to be above the target SoC 112 at the end of the route 110, the path of the route 110 can be changed to increase the expected energy consumption level 144 to a value equal to a difference between the current SoC 126 and the target SoC 112. For instance, the dispatch controller 120 or the ECM 122 can adjust the path of the route 110 to increase a total travel distance associated with the route 110 by following a less-direct path to the maintenance station 108 and/or by adding loops or repeated sections of the path, thereby increasing the expected energy consumption level 144 associated with the route 110. As another example, the dispatch controller 120 or the ECM 122 can adjust one or more portions of the route 110 to go up steeper hills or grades, and thereby increase the expected energy consumption level 144 associated with the route 110.

As still another example, the dispatch controller 120 or the ECM 122 can increase the expected energy consumption level 144 associated with the route 110 by adjusting the route 110 so that the machine 102 performs one or more work operations along the route 110. For instance, the dispatch controller 120 or the ECM 122 can have a list of work tasks to be performed by the machine 102 and/or any other machine, and can assign one or more of the work tasks to the machine 102. As an example, if the machine 102 is a haul truck, the dispatch controller 120 can assign the haul truck to pick up a payload at a first location on the route 110, carry the payload to a second location on the route 110, and drop off the payload at the second location before continuing to further locations along the route 110. The dispatch controller 120 or the ECM 122 can accordingly adjust the route 110 and/or corresponding dispatch data 134 to cause the machine 102 to travel to one or more work locations, perform one or more work operations, pick up and transport one or more payloads through one or more portions of the route 110, and/or otherwise consume additional energy by performing one or more work operations along the route 110.

The dispatch controller 120 and/or the ECM 122 can also instruct the machine 102 to use one or more of the parasitic systems 116 to consume an amount of energy while traveling along the route 110. For example, if the dispatch controller 120 determines that the expected destination SoC 146 associated with the route 110 is above a specific target SoC 112 by a particular amount of energy, the dispatch controller 120 can instruct the machine 102 to consume that particular amount of energy by converting the particular amount of energy to heat via a resistive grid, turning on heating and/or cooling systems, by turning on lights, by turning on hydraulic systems or other elements that consume energy, and/or via any other parasitic systems 116. Accordingly, the machine 102 can use the parasitic systems 116 to consume additional energy stored in the battery 104 while traveling along the route 110, such that the machine 102 arrives at the maintenance station 108 with the battery 104 at an SoC that satisfies the target SoC 112.

Accordingly, if the expected destination SoC 146 associated with the route 110 is above the target SoC 112, the dispatch controller 120 and/or the ECM 122 can adjust the route 110 or machine operations to be performed along the route 110 to increase the expected energy consumption level 144, such that the expected destination SoC 146 satisfies the target SoC 112. However, if the expected destination SoC 146 associated with the route 110 is instead below the target SoC 112, the dispatch controller 120 and/or the ECM 122 can adjust the route 110 to increase the SoC of the battery 104 at one or more segments 142 of the route 110, and/or to decrease the expected energy consumption level 144, such that the expected destination SoC 146 satisfies the target SoC 112.

For instance, if the expected energy consumption level 144 for the route 110 would cause the expected destination SoC 146 of the battery 104 to be below the target SoC 112 at the end of the route 110, the path of the route 110 can be changed to decrease the expected energy consumption level 144. As an example, the dispatch controller 120 or the ECM 122 can adjust the path of the route 110 to decrease a total travel distance associated with the route 110 by following a more-direct path to the maintenance station 108, thereby decreasing the expected energy consumption level 144 associated with the route 110. In some examples, the dispatch controller 120 or the ECM 122 can instruct one or more other machines or personnel on the worksite 100 to move at least temporarily, in order to clear the more-direct path for the machine 102. As another example, the dispatch controller 120 or the ECM 122 can adjust the route 110 to include segments 142 that follow flatter terrain, or that go downhill such that a regenerative braking system of the machine 102 is expected to capture energy and thereby decrease the overall expected energy consumption level 144 associated with the route 110.

As another example, if the expected energy consumption level 144 for the route 110 would cause the expected destination SoC 146 of the battery 104 to be below the target SoC 112 at the end of the route 110, the dispatch controller 120 or the ECM 122 can cause the machine 102 to connect to the charging station 106 and increase the SoC of the battery 104 before and/or during travel along the route 110. For instance, as discussed above, if the current SoC 126 minus the expected energy consumption level 144 associated with the route 110 would be below the target SoC 112, and charging station is relatively close to the machine 102, the machine 102 can travel to the charging station and charge the battery 104 from the current SoC 126 up to a target starting SoC 148 determined by the dispatch controller 120 and/or the ECM 122. The target starting SoC 148 ($SoC_{start}$) can be determined such that, if the battery 104 is charged to the target starting SoC before the machine 102 begins traversing the route 110, the target SoC 112 ($SOC_{target}$) can be reached by the end of the route 110 by subtracting the expected energy consumption level 144 ($Consumption_{expected}$) from the target starting SoC 148 ($SoC_{start}$):

$$SOC_{target} = SoC_{start} - Consumption_{expected}.$$

Accordingly, in this example, if the current SoC 126 is too low, the dispatch controller 120 can include the target starting SoC 148 in the dispatch data 134, in or alongside the route data 136, such that the machine 102 can travel to a charging station or other external power source to increase the SoC of the battery 104 to the target starting SoC 148. The machine 102 can accordingly begin travel along the route 110 with the battery at the target starting SoC 148, such that the target starting SoC 148 minus the expected energy consumption level 144 associated with the route 110 would satisfy the target SoC 112 for the service operation. In this example, the path of the route 110 and/or the corresponding expected energy consumption level 144 can be modified in the route data 136 to account for such initial travel to the charging station to increase the SoC of the battery 104 to the target starting SoC 148.

Similarly, if the charging station 106 or another charging station is located at a point along the route 110, the machine 102 can connect to the charging station after traveling through a first portion of the route 110, and use the charging station to increase the SoC of the battery 104. The battery 104 can accordingly be charged along the route 110 to a level such that expected energy consumption levels associated with remaining segments 142 of the route 110 are expected to decrease the SoC of the battery 104 to satisfy the target SoC 112 by the end of the route 110. The path of the route 110 and/or the corresponding expected energy consumption level 144 can be modified to account for such a detour to the charging station. In some examples, an increase of the SoC of the battery 104 at the charging station at a location along the route 110 can be factored into the expected energy consumption level 144 of the route 110.

In some examples, the dispatch controller 120 and/or the ECM 122 can determine the route 110 and/or machine operations to perform along the route 110 based at least in part on a severity level of the service operation to be performed on the machine 102. Different service operations can be associated with different severity levels. For example, oil changes or air filter changes can have relatively low severity levels, while battery faults or hydraulic system faults can have higher severity levels. As another example, a service operation for pre-planned maintenance can have a relatively low severity level, while a service operation for unplanned maintenance to fix a newly discovered leak can have a higher severity level.

Accordingly, in some examples, if the service operation to be performed on the machine 102 is relatively urgent and has a severity level above a threshold value, the dispatch controller 120 and/or the ECM 122 can avoid generating a route for the machine 102 that causes the machine 102 to perform work operations or travel through a less-direct path to the maintenance station 108, such that the machine 102 can arrive at the maintenance station 108 more quickly and the relatively urgent service operation can be performed quickly. However, if the service operation has a severity level that is under the threshold level, the dispatch controller 120 and/or the ECM 122 can generate a route that assigns the machine 102 to perform initial work operations before initiating travel toward the maintenance station 108, and/or that follows a less-direct path, such that it may take longer for the machine 102 to arrive at the maintenance station 108.

The dispatch controller 120 and/or the ECM 122 can determine initial dispatch data 134 associated with the route 110, as discussed above. The machine 102 can use the dispatch data 134 to travel along the route 110 from an initial location to the maintenance station 108. In some examples, the route data 136 in the dispatch data 134 determined by the dispatch controller 120 or the ECM 122 can include autonomous machine instructions that the machine 102 can follow to traverse the route 110. In other examples, the route data 136 in the dispatch data 134 determined by the dispatch controller 120 or the ECM 122 can include navigation instructions that can be presented to a driver via a display screen, speakers, and/or other elements of the machine 102, such that the driver can follow the navigation instructions to drive the machine 102 along the route 110.

In some examples, the route data 136 in the dispatch data 134 can also indicate operations the machine 102 is to perform along the route 110, such as operations to activate or deactivate parasitic systems 116 at specific points along the route 110 or while traversing certain segments 142. A driver of the machine 102 can accordingly perform the indicated operations along the route 110 in response to instructions or notifications provided via a display screen, speakers, and/or other elements of the machine 102, and/or the ECM 122 can cause the machine 102 to automatically perform such operations indicated by the route data 136.

The dispatch controller 120 and/or the ECM 122 can also adjust the route 110, and/or operations of the machine 102 to be performed along the route 110, after the machine 102 has embarked along the route 110 according to initial dispatch data 134. For example, the dispatch controller 120 and/or the ECM 122 can track the current SoC 126 of the battery 104 as the machine 102 travels along the route 110. The dispatch controller 120 and/or the ECM 122 can also generate updated values for the expected energy consumption level 144 and/or the expected destination SoC 146, for instance when the machine 102 reaches a new segment, based on energy expected to be consumed and/or captured by the machine 102 during upcoming segments 142 of the route 110 that the machine 102 has not yet traversed. The dispatch controller 120 and/or the ECM 122 can generate new or revised dispatch data 134, for instance including new or different route data 136, based on whether updated values for the expected energy consumption level 144 and/or the expected destination SoC 146 indicate that the SoC of the battery 104 is projected to satisfy the target SoC 112 when the machine 102 reaches the maintenance station 108 based on the current route 110.

If updated values of the expected energy consumption level 144 and/or the expected destination SoC 146, determined along the route 110, indicate that the battery 104 is likely to be above the target SoC 112 when the machine 102 reaches the maintenance station 108, the dispatch controller 120 and/or the ECM 122 can instruct the machine 102 to turn on one or more parasitic systems 116, and/or adjust the route 110 to take a longer path and/or traverse more uphill segments 142, to increase the expected energy consumption level 144 for the rest of the route 110 and lower the expected destination SoC 146.

In some examples, the parasitic systems 116 can be ranked based on expected energy consumption rates of the parasitic systems 116. Accordingly, the dispatch controller 120 and/or the ECM 122 can instruct the machine 102 to turn on a parasitic system that is expected to consume the most energy the most quickly to aggressively increase the expected energy consumption level 144 for the rest of the route 110. If the parasitic system associated with the highest energy consumption rate is not sufficient to increase the expected energy consumption level 144 to a level that causes the expected destination SoC 146 to satisfy the target SoC 112, the dispatch controller 120 and/or the ECM 122 can instruct the machine 102 to turn on one or more additional parasitic systems 116 to further increase the expected energy consumption level 144 for the rest of the route 110. The one or more additional parasitic systems 116 can be associated with lower energy consumption rates than the parasitic system that was initially turned on, but the combination of that initial parasitic system and the one or more additional parasitic systems 116 can increase the overall expected energy consumption level 144 for the rest of the route 110.

In some examples, the dispatch controller 120 and/or the ECM 122 can be configured to avoid turning on certain parasitic systems 116 based on environmental factors or other factors. For instance, if the machine 102 is a staffed machine, the dispatch controller 120 and/or the ECM 122 can avoid turning on a heater in the cab of the machine 102 if an ambient temperature measurement is above a threshold temperature, even if the cab heater is a parasitic system that would consume a relatively high amount of energy. In some examples, some parasitic systems 116 can be used in combination. For instance, the dispatch controller 120 and/or the ECM 122 can turn on a battery heating system and a battery cooling system of the machine 102 simultaneously to increase energy consumption from the battery 104, and to heat and cool the battery 104 simultaneously without moving a temperature of the battery 104 outside an operating range.

If updated values of the expected energy consumption level 144 and/or the expected destination SoC 146, determined along the route 110, indicate that the battery 104 is likely to be below the target SoC 112 when the machine 102 reaches the maintenance station 108, the dispatch controller 120 and/or the ECM 122 can instruct the machine 102 to turn off one or more parasitic systems 116, and/or adjust the route 110 to take a shorter path or traverse flatter and/or more downhill segments 142, to decrease the expected energy consumption level 144 for the rest of the route 110 and increase the expected destination SoC 146. In some examples, the dispatch controller 120 and/or the ECM 122 may also instruct the machine 102 to take a detour to a charging station to charge the battery 104 to a designated SoC, such that the expected energy consumption level 144 for an adjusted route 110 from the charging station to the maintenance station 108 is expected to decrease the SoC of the battery 104 from the designated SoC to the target SoC 112 by the time the machine 102 reaches the maintenance station 108.

Overall, the dispatch controller 120 and/or the ECM 122 can cause the machine 102 to traverse the route 110 and arrive at the maintenance station 108 with the battery 104 at an SoC that satisfies the target SoC 112 associated with the service operation that is to be performed on the machine 102 at the maintenance station 108. Accordingly, the service operation can be performed on the machine 102 at the maintenance station 108 without further charging or discharging the battery 104 after the machine 102 arrives at the maintenance station 108.

Figure 2:
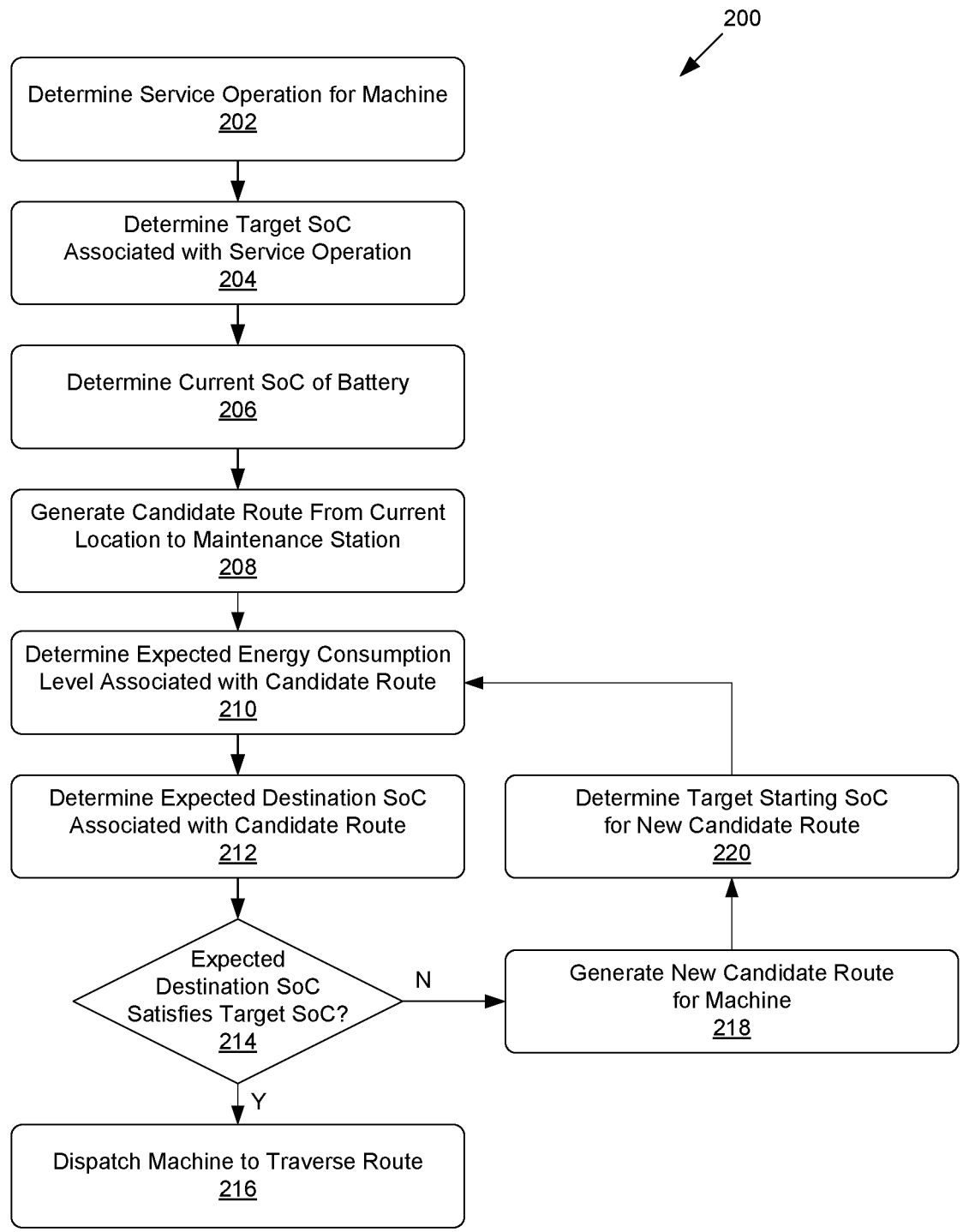
FIG. 2 shows a flowchart illustrating an example process for dispatching the machine to travel along a route to a maintenance station.
Figure 4:
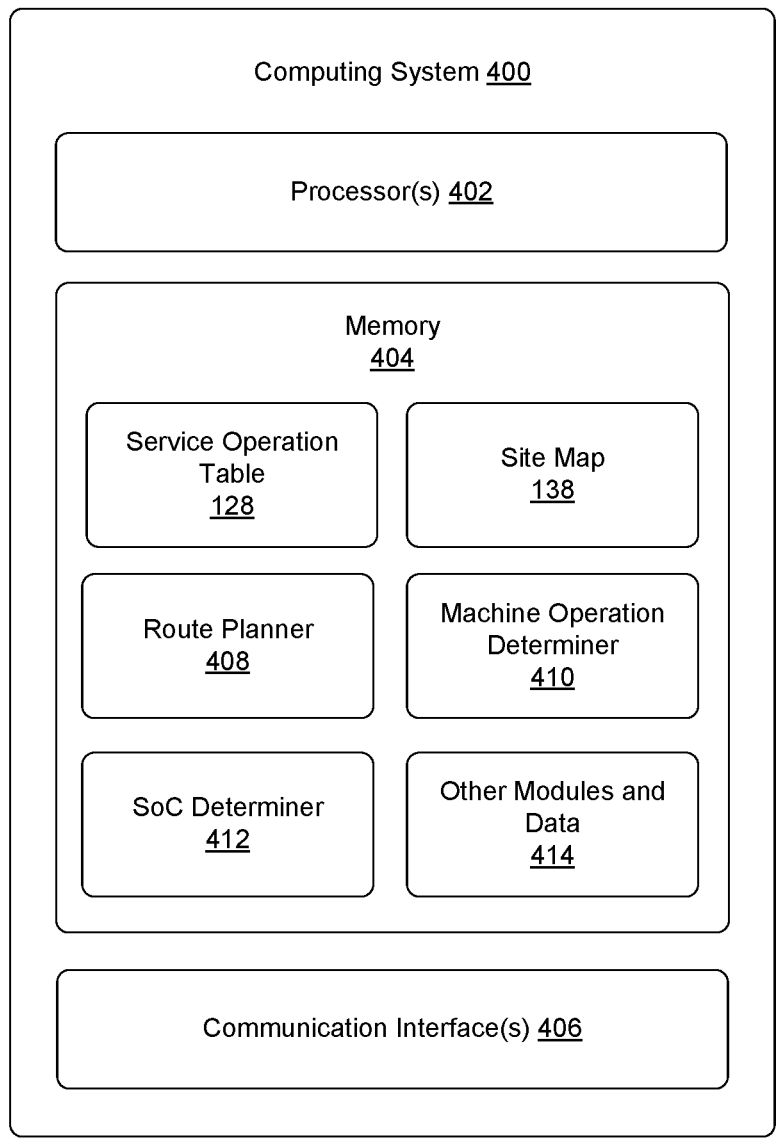
FIG. 4 shows an example system architecture for a computing system.

FIG. 2 shows a flowchart 200 illustrating an example process for dispatching the machine 102 to travel along the route 110 to the maintenance station 108. The operations shown in FIG. 2 can be performed by a system that includes the dispatch controller 120 and/or the ECM 122. An example architecture of such a system is shown in FIG. 4, and is described below with respect to that figure.

At block 202, the system can determine a service operation to be performed on the machine 102. In some examples, the dispatch controller 120 or the ECM 122 can determine that the machine 102 is due for a particular service operation based on a predetermined maintenance schedule or based on a length of time that has passed since a previous service operation. In other examples, a user can provide instructions to the dispatch controller 120 indicating that a particular service operation is to be performed on the machine 102. In still other examples, sensors 124 of the machine 102 can determine a fault or other issue that can be addressed by a service operation. The dispatch controller 120 or the ECM 122 can accordingly determine the service operation associated with the fault or other issue detected by sensors 124 of the machine 102.

At block 204, the system can determine the target SoC 112 associated with the service operation determined at block 202. For example, the dispatch controller 120 and/or the ECM 122 can use the service operation table 128 to determine the target SoC 112 that corresponds to the service operation.

At block 206, the system can determine the current SoC 126 of the battery 104 of the machine 102. For example, the dispatch controller 120 can determine the current SoC 126 of the battery 104 based on machine data 130 transmitted to the dispatch controller 120 from the machine 102. As another example, the ECM 122 may have access to sensor data indicating the current SoC 126 of the battery 104.

At block 208, the system can generate a candidate route for the machine 102. The candidate route can be a path through the worksite 100 from a current location of the machine 102, for instance indicated by location data 132, to a location of the maintenance station 108. The system can, in some examples, use the site map 138 to determine segments 142 of the candidate route that avoid obstacles 140 on the worksite 100, determine incline or decline angles of the segments 142, and/or otherwise determine segments 142 of the candidate route. The system can also, in some examples, determine machine operations to be performed by the machine 102 at locations along the route, such as work operations, operations to charge the battery 104 at a charging station or other external power source, operations to turn parasitic systems 116 on or off, and/or other machine operations.

At block 210, the system can determine the expected energy consumption level 144 associated with the candidate route determined at block 208. The expected energy consumption level 144 can be based on a total of positive and/or negative expected energy consumption levels associated with the segments 142 of the candidate route. For instance, the system can determine the machine 102 is expected to consume a first amount of energy while traversing some segments 142 of the candidate route and/or by turning on one or more parasitic systems 116, and to capture or obtain a second amount of energy via regenerative braking and/or connecting to power sources while traversing other segments 142 of the candidate route, such that the expected energy consumption level 144 is the first amount of energy minus the second amount of energy.

At block 212, the system can determine the expected destination SoC 146 associated with the candidate route. The system can determine the expected destination SoC 146 by subtracting the expected energy consumption level 144 associated with the candidate route, determined at block 210, from the current SoC of the battery 104 determined at block 206.

At block 214, the system can determine whether the expected destination SoC 146 associated with the candidate route satisfies the target SoC 112 associated with the service operation. For example, the expected destination SoC 146 can satisfy the target SoC 112 if the expected destination SoC 146 is equal to a specific value of the target SoC 112, is above a minimum value indicated by the target SoC 112, is below a maximum value indicated by the target SoC 112, or is within a range of values indicated by the target SoC 112.

If the expected destination SoC 146 satisfies the target SoC 112 associated with the service operation (Block 214—Yes), the system can accept the candidate route as the route 110, and can dispatch the machine 102 to traverse the route 110 at block 216. For example, the dispatch controller 120 can generate the dispatch data 134, including route data 136 that indicates a path of the route 110 and/or machine operations to perform along the route 110, and transmit the dispatch data 134 to the machine 102. In other examples, the ECM 122 can generate the dispatch data 134 on-board the machine 102. The machine 102 can follow the route data 136 to autonomously travel along the route 110, or use the route data 136 to present navigation instructions to a driver of the machine 102. The machine 102 can also follow the route data 136 to automatically perform indicated machine operations along the route 110, or use the route data 136 to present instructions associated with the indicated machine operations to a driver of the machine 102.

If the expected destination SoC 146 associated with the candidate route does not satisfy the target SoC 112 associated with the service operation (Block 214—No), the system can generate a new candidate route for the machine 102 at block 218. The new candidate route can be an altered version of the initial candidate route generated at block 208, or version of another candidate route previously generated at block 218. For example, the new candidate route can include more segments 142, fewer segments 142, take a different path through the worksite 100, be associated with different machine operations, and/or otherwise differ from the previous candidate route that had an expected destination SoC that did not satisfy the target SoC 112 associated with the service operation.

In some examples, if the expected destination SoC 146 associated with a candidate route is below a minimum value of the target SoC 112, the system can generate a new candidate route at block 218 that is altered to include an initial detour from the current location of the machine 102 to a charging station or other external power source. The system can determine, at block 220, the target starting SoC 148 that the battery 104 should be charged to, at the charging station or other external power source, during the initial detour. The system can also determine an updated expected energy consumption level associated with portions of the new candidate route to be traversed after the initial detour to the charging station or other external power source. The system can further determine an updated expected destination SoC associated with the new candidate route that indicates a predicted SoC of the battery 104 if the battery 104 is initially charged to the target starting SoC 148 and is then discharged according to the updated expected energy consumption level. The new candidate route can accordingly allow the machine 102 to increase the SoC of the battery 104 to the target starting SoC 148, for example before leaving an area of the worksite 100 where the machine 102 is currently located. The system can return to blocks 210 through 214 to attempt to confirm that the new candidate route, including the initial detour to charge the battery 104 to the target starting SoC 148, would cause the expected destination SoC 146 to satisfy the target SoC 112.

In other examples, the system may skip block 220, but generate the new candidate route to include visits to one or more charging stations along the route 110 after leaving the area of the worksite 100 where the machine 102 is currently located. For instance, the system can generate the new candidate route such that the machine 102 is instructed to travel to a charging station approximately halfway along the route and charge the battery 104 to a designated SoC level that, if decreased according to an expected power consumption level associated with remaining portions of the new candidate route, will cause the expected destination SoC associated with the new candidate route to satisfy the target SoC 112.

As another example, if the expected destination SoC 146 associated with a candidate route is below a minimum value of the target SoC 112, the system can generate a new candidate route at block 218 that is associated with a lower expected energy consumption level than the previous candidate route. The system can, for instance, adjust the path of the route 110 to be more direct to the maintenance station 108, and/or include more downhill segments 142 at which a regenerative braking system may capture energy and thus decrease the overall expected energy consumption level of the new candidate route relative to the previous candidate route. In this example, the system may skip block 220 if generation of the new candidate route with a lower expected energy consumption level is sufficient to, based on the current SoC 126 of the battery 104, cause the expected destination SoC associated with the new candidate route to satisfy the target SoC 112.

If the expected destination SoC 146 associated with a candidate route is above a maximum value of the target SoC 112, the system can generate a new candidate route at block 218 that is associated with a higher expected energy consumption level than the previous candidate route. The system can, for example, adjust the path of the route 110 to be less direct to the maintenance station 108, and/or or include more uphill segments 142 that the machine 102 would traverse by consuming higher levels of energy from the battery 104. As another example, the system can generate the new candidate route to indicate that the machine 102 is to consume energy from the battery 104 by performing one or more work tasks proximate to the current location of the machine 102 and/or at one or more locations along the path of the new candidate route. As yet another example, the system can generate the new candidate route to indicate that the machine 102 is to consume energy from the battery 104 by turning on one or more parasitic systems 116 while traveling along the new candidate route. In some of these examples, the system can skip block 220. In other examples, the system can determine the target starting SoC 148 for the new candidate route at block 220 that indicates when the machine 102 is to initiate travel along the new candidate route. For instance, if the current SoC 126 is too high, the system can indicate that the machine 102 should continue to perform work operations until the SoC of the battery 104 drops to the target starting SoC 148 associated with the new candidate route, and then begin traversal of the new candidate route.

After generating the new candidate route at block 218 and/or a corresponding target starting SoC for the new candidate route at block 220, the system can determine the expected energy consumption level 144 associated with the new candidate route at block 210, determine the expected destination SoC 146 associated with the new candidate route at block 212, and determine whether the expected destination SoC 146 associated with the new candidate route satisfies the target SoC 112 of the service operation at block 214. If the expected destination SoC 146 associated with the new candidate route does satisfy the target SoC 112, the system can accept the new candidate route as the route 110 and dispatch the machine 102 to traverse the route 110 at block 216. If the expected destination SoC 146 associated with the new candidate route does not satisfy the target SoC 112, the system can adjust one or more attributes of the candidate route to generate an additional new candidate route and/or corresponding target starting SoC at block 218 and 220. The system can accordingly loop through blocks 210 through 220 until the system generates a candidate route associated with an expected destination SoC that satisfies the target SoC of the service operation to be performed on the machine 102.

Once the system determines a route that has an expected destination SoC that satisfies the target SoC of the service operation to be performed on the machine 102, the system can dispatch the machine 102 to travel along that route. After the machine 102 has begun traveling along the route determined by the process shown in FIG. 2, the dispatch controller 120 and/or the ECM 122 can use the process described below with respect to FIG. 3 to dynamically adjust the route 110.

Figure 3:
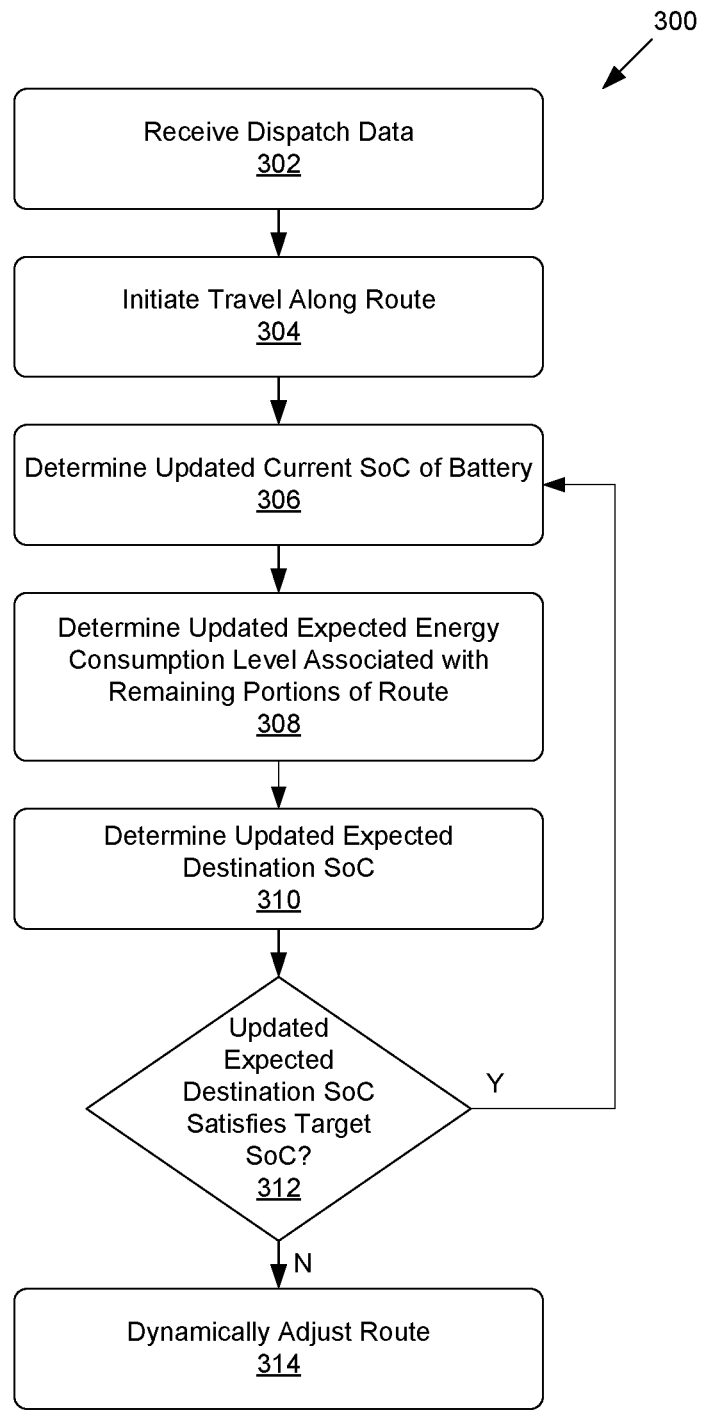
FIG. 3 shows a flowchart illustrating an example process for dynamically adjusting the route as the machine travels to the maintenance station.

FIG. 3 shows a flowchart 300 illustrating an example process for dynamically adjusting the route 110 as the machine 102 travels to the maintenance station 108. The operations shown in FIG. 3 can be performed by a system that includes the dispatch controller 120 and/or the ECM 122. An example architecture of such a system is shown in FIG. 4, and is described below with respect to that figure.

At block 302, the system can receive dispatch data 134. The dispatch data 134 can be generated by the same system, or a different system, using the process discussed above with respect to FIG. 2. For instance, the dispatch data 134 can be generated by the dispatch controller 120, and the ECM 122 of the machine 102 can receive the dispatch data 134 from the dispatch controller 120 at block 302. The dispatch data 134 can indicate the target SoC 112 associated with a service operation to be performed on the machine 102 at the maintenance station 108, and route data 136 indicating a path of the route 110 and/or machine operations to be performed by the machine 102 while traveling along the route 110.

At block 304, the system can initiate travel of the machine 102 along the route 110 based on the dispatch data 134. For example, if the machine 102 is an autonomous machine, the machine 102 can automatically perform operations to travel along the route 110 based on the route data 136 in the dispatch data 134. In other examples in which the machine 102 is a staffed machine, the machine 102 can present navigation instructions to a driver based on the route data 136.

At block 306, the system can determine an updated current SoC of the battery 104. The SoC of the battery 104 can increase and/or decrease as the machine 102 travels along the route 110, and accordingly the system can determine an updated value of the current SoC 126 of the battery 104 at block 306. In examples in which the system is the dispatch controller 120, the system can determine the updated current SoC 126 of the battery 104 based on new machine data received from the machine 102.

At block 308, the system can determine an updated expected energy consumption level associated with remaining portions of the route 110. The updated expected energy consumption level can be determined based on a total of positive and/or negative expected energy consumption levels associated with segments 142 of the route 110 that have not yet been traversed by the machine 102.

In examples in which the system is the dispatch controller 120, the system can determine a new current location of the machine 102 based on location data 132 in new machine data received from the machine 102, determine which segments 142 of the route 110 the machine 102 has yet to traverse, and determine the expected energy consumption levels associated with those segments 142 to determine the updated expected energy consumption level associated with remaining portions of the route 110. Similarly, if the system is the ECM 122, the system can use location data 132 indicating the current location of the machine 102 to determine expected energy consumption levels associated with segments 142 that have not yet been traversed, and accordingly determine the updated expected energy consumption level associated with remaining portions of the route 110.

At block 310, the system can determine an updated expected destination SoC associated with the route 110, based on the updated expected energy consumption level associated with remaining portions of the route 110 determined at block 308. For example, the system can determine the updated expected destination SoC by subtracting the updated expected energy consumption level associated with remaining portions of the route 110, determined at block 308, from the updated current SoC of the battery 104 determined at block 306.

At block 312, the system can determine whether the updated expected destination SoC associated with the route 110 satisfies the target SoC 112 associated with the service operation. For example, the updated expected destination SoC can satisfy the target SoC 112 if the updated expected destination SoC is equal to a specific value of the target SoC 112, is above a minimum value indicated by the target SoC 112, is below a maximum value indicated by the target SoC 112, or is within a range of values indicated by the target SoC 112.

If the updated expected destination SoC 146 satisfies the target SoC 112 associated with the service operation (Block 312—Yes), the system can loop through blocks 306 and 312 unless and until an updated expected destination SoC, determined based on an updated value of the current SoC 126 and an updated expected energy consumption level associated with new remaining portions of the route 110 does not satisfy the target SoC 112. However, if the updated expected destination SoC 146 determined at block 312 does not satisfy the target SoC 112 associated with the service operation (Block 312—No), the system can dynamically adjust the route 110 at block 314.

For example, if the updated expected destination SoC is below a minimum value of the target SoC 112, the system can dynamically adjust the route 110 to add a detour to a charging station or other external power source to increase the SoC of the battery 104 to a level that will cause a subsequent updated expected destination SoC to satisfy the target SoC 112. If the updated expected destination SoC 146 is below a minimum value of the target SoC 112, the system can also, or alternately, adjust the remaining path of the route 110 to be more direct to the maintenance station 108, and/or include more downhill segments 142 at which a regenerative braking system may capture energy and thus decrease a subsequent updated expected energy consumption level associated with remaining portions of the route 110.

If the updated expected destination SoC is instead above a maximum value of the target SoC 112, the system can dynamically adjust the remaining path of the route 110 to be less direct to the maintenance station 108, and/or or to include more uphill segments 142 that the machine 102 would traverse by consuming higher levels of energy from the battery 104. As another example, the system can dynamically adjust the route 110 to cause the machine 102 to consume energy from the battery 104 by turning on one or more parasitic systems 116 while traveling along remaining portions of the route 110.

Overall, the system can have used the process shown in FIG. 2 to initially generate a route that is predicted to cause the SoC of the battery 104 to satisfy the target SoC 112 when the machine 102 arrives at the maintenance station. However, operating conditions, unexpected obstacles 140 along the route 110, travel delays, and/or other factors may cause the battery 104 to charge and discharge along the route 110 at different rates than were originally predicted when generating the route according to the process of FIG. 2. Accordingly, the same system or a different system can use the process of FIG. 3 to dynamically adjust the path of the route 110, and/or machine operations to be performed along the route 110, if a predicted destination SoC begins trending above or below the target SoC 112 after the machine 102 begins traveling along the route. Dynamically adjusting the route 110 can therefore cause the SoC of the battery 104 to satisfy the target SoC 112 when the machine 102 arrives at the maintenance station 108.

FIG. 4 shows an example system architecture for a computing system 400. In some examples, the computing system 400 can be the dispatch controller 120 described above, or another server or computer that is remote from the machine 102. In other examples, the computing system 400 can be the ECM 122 or other on-board computing system of the machine 102. In some examples, elements of the computing system 400 can be distributed between the dispatch controller 120 and the machine 102. The computing system 400 can include one or more computing devices or other controllers that include one or more processors 402, memory 404, and communication interfaces 406.

The processor(s) 402 can operate to perform a variety of functions as set forth herein. The processor(s) 402 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 402 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 402 can also access content and computer-executable instructions stored in the memory 404, and execute such computer-executable instructions.

The memory 404 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 402 to perform the operations described herein.

For example, the memory 404 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 402 and/or communication interface(s) 406 during execution thereof by the computing system 400. For example, the processor(s) 402 can possess local memory, which also can store program modules, program data, and/or one or more operating systems.

In some examples, the memory 404 can store the service operation table 128, the site map 138, a route planner 408, a machine operation determiner 410, an SoC determiner 412, and/or other modules and data 414. The route planner 408 can be configured to determine a path for the route 110, determine segments 142 of the route 110, determine the route data 136 associated with the route 110, determine whether the expected destination SoC 146 associated with the route 110 satisfies the target SoC 112 determined based on the service operation table 128, and/or to perform other operations associated with planning the route 110. The machine operation determiner 410 can determine or predict machine operations of the machine 102 while the machine 102 travels through the route 110, and/or determine or predict other information associated with machine operations. The SoC determiner 412 can, based on the route 110 or a candidate route determined by the route planner 408, machine operations associated with the route 110 determined by the machine operation determiner 410, the current SoC 126 of the battery 104, and/or other information, determine the expected energy consumption level 144 and/or the expected destination SoC 146 associated with the route 110. The other modules and data 414 can be utilized by the computing system 400 to perform or enable performing any action taken by the computing system 400. For example, the other modules and data 414 can include a platform, operating system, and/or applications, as well as data utilized by the platform, operating system, and/or applications.

The communication interfaces 406 can include transceivers, modems, interfaces, antennas, and/or other components that can transmit and/or receive data over networks or other data connections. In some examples, the communication interfaces 406 can be the wireless communication interfaces 118 of the machine 102 discussed above. In other examples, the communication interfaces 406 can be configured to send data to, and/or receive data from, the wireless communication interfaces 118 of the machine 102. For instance, in examples in which the computing system 400 is the dispatch controller 120, the computing system 400 can use the communication interfaces 406 to receive the machine data 130 from the machine 102, to send the dispatch data 134 to the machine 102, and/or to send or receive any other type of data.

INDUSTRIAL APPLICABILITY

As described above, service operations can be associated with specific SoC values or ranges of SoC values. For example, maintenance technicians or others may consider it optimal and/or safest to perform a particular service operation on the machine 102 when the SoC of the battery 104 of the machine 102 is below a maximum threshold SoC, is above a minimum threshold SoC, or is within a particular range of SoC values.

If the machine 102 were to arrive at the maintenance station 108 for that service operation to be performed, but the battery 104 is at an SoC above a maximum threshold SoC for the service operation, maintenance staff may have to spend time and effort idling the machine 102 or otherwise discharging the battery 104 until the SoC of the battery 104 is below the maximum threshold SoC for the service operation. In some examples, intentionally discharging the battery 104 to below the maximum threshold SoC can lead to waste of time, effort, money, and/or other resources that had previously been used to charge the battery 104 to a higher SoC. Similarly, if the machine 102 were to arrive at the maintenance station 108 with the battery 104 at an SoC that is below a minimum threshold SoC for a service operation to be performed or completed, or that is below a level sufficient to power travel of the machine 102 from the maintenance station 108 to the charging station 106, maintenance staff may have to spend time and effort charging the battery 104 before performing the service operation and/or before the machine 102 can leave the maintenance station 108.

The maintenance station 108 may have limited space and/or a limited number of available maintenance staff members. If the machine 102 were to arrive at the maintenance station 108 with the battery 104 at an SoC that does not satisfy the target SoC 112 associated with a service operation to be performed on the machine 102, the machine 102 can take up space at the maintenance station 108 and prevent maintenance staff members from working on other machines while the battery 104 is charged or discharged to the target SoC 112.

However, as described herein, the dispatch controller 120 and/or the ECM 122 can plan the route 110 and/or dynamically adjust the route 110 so that the machine 102 arrives at the maintenance station 108 with the battery 104 at an SoC that satisfies the target SoC 112 for the service operation to be performed on the machine 102. Accordingly, the service operation can be performed on the machine 102 when the machine 102 arrives at the maintenance station 108, without the battery 104 having to be further discharged or charged. This can decrease overall time for the service operation to be performed and thus allow the machine 102 to resume work on the worksite 100 more quickly, allow the machine 102 to depart the maintenance station 108 without the battery 104 having to be charged at the maintenance station 108, and/or allow more efficient usage of resources at the maintenance station 108.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A computer-implemented method, comprising:
identifying, by one or more processors, a service operation to be performed on a work machine at a maintenance station of a worksite, wherein the work machine is configured to perform work operations at the worksite;
determining, by the one or more processors, a target state of charge (SoC) associated with the service operation to be performed on the work machine, based on predefined information identifying different service operations and target SoCs that correspond to the different service operations;
determining, by the one or more processors, a current SoC of a battery of the work machine;
generating, by the one or more processors, and based at least in part on terrain information associated with the worksite, a path for a route between a current location of the work machine and the maintenance station that is predicted to cause an SoC of the battery to satisfy the target SoC upon arrival of the work machine at the maintenance station, by:

determining an expected energy consumption level associated with traversal of the route by the work machine;
determining an expected destination SoC of the battery associated with the traversal of the route by the work machine, based on the current SoC of the battery and the expected energy consumption level; and
determining that the expected destination SoC satisfies the target SoC associated with the service operation to be performed on the work machine; and
dispatching, by the one or more processors, the work machine to traverse the route.

2. The computer-implemented method of claim 1, wherein the target SoC is at least a minimum target SoC level associated with travel of the work machine from the maintenance station to a charging station.

3. The computer-implemented method of claim 1, wherein the target SoC is an SoC level associated with operations to perform the service operation at the maintenance station.

4. The computer-implemented method of claim 1, wherein:
generating the path of the route further comprises determining machine operations for the work machine to perform during the traversal of the route, the machine operations including at least one of:
one or more particular work operations, or
activation of one or more parasitic systems of the work machine, and
performance of the machine operations increases the expected energy consumption level associated with the traversal of the route by the work machine.

5. The computer-implemented method of claim 1, further comprising adjusting, by the one or more processors, the path of the route to cause the work machine to increase the SoC of the battery prior to traversal of a remaining portion of the route by connecting to an external power source.

6. The computer-implemented method of claim 5, further comprising:
determining, by the one or more processors, a target starting SoC associated with the route; and
instructing, by the one or more processors, the work machine to travel to the external power source and charge the battery to the target starting SoC before traversing the remaining portion of the route.

7. The computer-implemented method of claim 6, further comprising:
determining, by the one or more processors, an updated expected energy consumption level based on adjustments to the path of the route;
determining, by the one or more processors, an updated expected destination SoC, based on the target starting SoC and the updated expected energy consumption level; and
determining that the updated expected destination SoC satisfies the target SoC.

8. The computer-implemented method of claim 1, wherein determining the expected energy consumption level comprises:
determining, by the one or more processors, a plurality of expected energy consumption levels that correspond with a plurality of segments of the route; and
determining, by the one or more processors, a total of the plurality of expected energy consumption levels.

9. The computer-implemented method of claim 8, wherein the plurality of expected energy consumption levels includes at least one of:
positive energy consumption levels associated with powering propulsion of the work machine through a first subset of the plurality of segments, or negative energy consumption levels associated with energy captured by a regenerative braking system of the work machine through a second subset of the plurality of segments.

10. The computer-implemented method of claim 1, further comprising:
determining, by the one or more processors after the work machine has initiated travel along the route, an updated current SoC of the battery;
determining, by the one or more processors, an updated expected energy consumption level associated with traversal of remaining portions of the route by the work machine;
determining, by the one or more processors, an updated expected destination SoC of the battery associated with the traversal of the route by the work machine, based on the updated current SoC of the battery and the updated expected energy consumption level;
determining, by the one or more processors, that the updated expected destination SoC does not satisfy the target SoC; and
adjusting, by the one or more processors, the path of the route to cause the updated expected destination SoC to satisfy the target SoC.

11. The computer-implemented method of claim 10, wherein adjusting the path of the route comprises at least one of:
adjusting one or more segments of the route associated with the remaining portions of the route,
adding a detour to an external power source to charge the battery to an SoC level predicted to cause the updated expected destination SoC to satisfy the target SoC, or
activating one or more parasitic systems of the work machine during traversal of the remaining portions of the route.

12. A computing system, comprising:
one or more processors; and
memory storing computer-executable instructions that, when executed by the one or more processors, cause the one or more processors to perform operations comprising:
identifying a service operation to be performed on a work machine at a maintenance station of a worksite, wherein the work machine is configured to perform work operations at the worksite;
determining a target state of charge (SoC) associated with the service operation to be performed on the work machine, based on predefined information identifying different service operations and target SoCs that correspond to the different service operations;
determining a current SoC of a battery of the work machine;
generating, based at least in part on terrain information associated with the worksite, a path for a route between a current location of the work machine and the maintenance station that is predicted to cause an SoC of the battery to satisfy the target SoC upon arrival of the work machine at the maintenance station, by:
determining an expected energy consumption level associated with traversal of the route by the work machine;
determining an expected destination SoC of the battery associated with the traversal of the route by the work machine, based on the current SoC of the battery and the expected energy consumption level; and determining that the expected destination SoC satisfies the target SoC associated with the service operation to be performed on the work machine; and dispatching the work machine to traverse the route.

13. The computing system of claim 12, wherein determining the expected energy consumption level comprises:
   determining a plurality of expected energy consumption levels that correspond with a plurality of segments of the route; and
   determining a total of the plurality of expected energy consumption levels.

14. The computing system of claim 12, wherein the operations further comprise:
   determining, after the work machine has initiated travel along the route, an updated current SoC of the battery;
   determining an updated expected energy consumption level associated with traversal of remaining portions of the route by the work machine;
   determining an updated expected destination SoC of the battery associated with the traversal of the route by the work machine, based on the updated current SoC of the battery and the updated expected energy consumption level;
   determining that the updated expected destination SoC does not satisfy the target SoC; and
   adjusting the path of the route to cause the updated expected destination SoC to satisfy the target SoC.

15. A dispatch controller associated with a worksite, the dispatch controller comprising:
   one or more processors; and
   memory storing computer-executable instructions that, when executed by the one or more processors, cause the one or more processors to perform operations comprising:
      receiving an indication of a particular service operation to be performed on a work machine, different from the dispatch controller, at a maintenance station of the worksite, wherein the work machine is configured to perform work operations at the worksite;
      determining a target state of charge (SoC) associated with the particular service operation to be performed on the work machine;
      receiving machine data, from the work machine, indicating:
         a current location of the work machine; and
         a current SoC of a battery of the work machine;
      generating, based at least in part on terrain information associated with the worksite, a path for a route between the current location of the work machine and the maintenance station that is predicted to cause an SoC of the battery of the work machine to satisfy the target SoC upon arrival of the work machine at the maintenance station, by:
         determining an expected energy consumption level associated with traversal of the route by the work machine;
         determining an expected destination SoC of the battery associated with the traversal of the route by the work machine, based on the current SoC of the battery and the expected energy consumption level; and
         determining that the expected destination SoC satisfies the target SoC associated with the particular service operation to be performed on the work machine; and
      transmitting dispatch data to the work machine, the dispatch data comprising:
         the target SoC; and
         route data indicating the path of the route.

16. The dispatch controller of claim 15, wherein:
   the route data indicates an initial portion of the route from the current location of the work machine to an external power source, and
   the dispatch data further comprises instructions to charge the battery of the work machine to a target starting SoC at the external power source.

17. The dispatch controller of claim 15, wherein receiving the indication of the particular service operation comprises at least one of:
   determining, based on a predetermined maintenance schedule, that the work machine is due for the particular service operation,
   receiving user input indicating the particular service operation, or
   receiving a notification of a fault detected by a sensor of the work machine that is associated with the particular service operation.

18. The dispatch controller of claim 15, wherein:
   the memory stores a service operation table that indicates a plurality of service operations and a corresponding plurality of target SoCs, and
   determining the target SoC is based on one of the plurality of target SoCs that is associated with the particular service operation on the service operation table.

19. The dispatch controller of claim 15, wherein:
   generating the path of the route further comprises determining machine operations for the work machine to perform during the traversal of the route, and
   the dispatch data comprises indications of the machine operations.

20. The dispatch controller of claim 15, wherein:
   the work machine is an autonomous machine, and
   the dispatch data comprises instructions that cause the autonomous machine to traverse the route automatically.

* * * * *